United States Patent
Nipane et al.

(10) Patent No.: US 11,601,383 B1
(45) Date of Patent: Mar. 7, 2023

(54) IN-PLACE CONVERSION OF A VIRTUAL SWITCH ON A HOST

(71) Applicant: VMware, Inc., Palo Alto, CA (US)

(72) Inventors: Nilesh Nipane, Mountain View, CA (US); Aarti Lolage, Palo Alto, CA (US); Nikhil Rajguru, Palo Alto, CA (US); Akshay Kale, Union City, CA (US); Kaustubh Naniwadekar, Maple Ridge (CA)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/476,758

(22) Filed: Sep. 16, 2021

(51) Int. Cl.
*H04L 12/24* (2006.01)
*H04L 12/46* (2006.01)
*H04L 12/931* (2013.01)
*H04L 12/935* (2013.01)
*H04L 49/00* (2022.01)
*H04L 45/586* (2022.01)

(52) U.S. Cl.
CPC ............ *H04L 49/70* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 8,639,783 B1* | 1/2014 | Bakke | H04L 41/0897 |
| | | | 710/316 |
| 9,135,050 B2* | 9/2015 | Kothari | G06F 9/45558 |
| 9,231,892 B2* | 1/2016 | Baphna | H04L 12/4641 |
| 10,728,179 B2* | 7/2020 | Baphna | H04L 49/70 |
| 10,735,259 B2 | 8/2020 | Ghag et al. | |
| 2018/0241624 A1* | 8/2018 | Sun | H04L 41/0895 |
| 2018/0367402 A1* | 12/2018 | Harneja | H04L 41/0873 |
| 2019/0273718 A1* | 9/2019 | Ahuja | H04L 63/0236 |
| 2019/0317786 A1* | 10/2019 | Sun | G06F 9/45558 |
| 2019/0363965 A1* | 11/2019 | Tewari | H04L 43/10 |
| 2019/0391831 A1* | 12/2019 | Yang | G06F 9/45558 |
| 2020/0274828 A1* | 8/2020 | Alapati | H04L 49/356 |

* cited by examiner

*Primary Examiner* — Alpus Hsu
(74) *Attorney, Agent, or Firm* — Patterson + Sheridan, LLP

(57) ABSTRACT

The disclosure provides an approach for in-place conversion of a virtual switch on a host. Techniques are provided for in-place conversion of a virtual switch from a first type of virtual switch to a destination type of virtual switch. A method includes rekeying, by a second manager agent, one or more uplink ports associated with one or more logical switches implemented by the virtual on the host with the unique identifier. The rekeying includes updating one or more existing uplink port identifiers assigned to the one or more uplink ports with the unique identifier associated with a first manager agent. The method includes removing, by the first manager agent, an association of the one or more uplink ports with the opaque network; and informing the first manager and the second manager that the virtual switch is of the destination type of virtual switch.

20 Claims, 6 Drawing Sheets

Virtualization Manager 108

VM 112a eth0.backing = Mgmt DVPportgroup
eth1.backing = LS1

Virtual Switch Configuration 200

210

Mgmt DVPortgroup type: static/ephemeral
backingType: standard

Logical Switch Configuration
(SwitchType1Portgroup)

read-only ports
transportZoneUuid: <tz-id>
type: ephemeral
backingType: SwitchType1
defaultPortConfig.VNI: <vni>

HostMember1 uplink -> pnic mapping

HostMember2

Uplink -> pnic mapping
SwitchType1 = true
ens = false
transportZones = <tz-ids>
nextUsedUplink = [...]

HostMember1 uplink -> pnic mapping

Uplink Portgroup

FIG. 2B

IN-PLACE CONVERSION OF A VIRTUAL SWITCH ON A HOST

BACKGROUND

Software defined networking (SDN) may be used to create a software defined datacenter (SDDC). An SDDC involves a plurality of hosts in communication over a physical network infrastructure of a data center (e.g., on-premise data center or a cloud data center). Each host has one or more virtualized endpoints such as virtual machines (VMs), containers, or other virtual computing instances (VCIs). Though certain aspects are discussed herein with respect to VMs, it should be noted that the techniques may apply to other suitable VCIs as well.

Any arbitrary set of VMs in a datacenter may be placed in communication across a logical Layer 2 network by connecting them to a logical switch. A logical switch is collectively implemented by at least one virtual switch on each host that has a VM connected to the logical switch. Virtual switches provide packet forwarding and networking capabilities to virtual machines running on the host. The virtual switch on each host operates as a managed edge switch implemented in software by the hypervisor on each host.

There are several types of virtual switches that can be configured on a given hypervisor. For example, vendors may provide different virtual switches that have different capabilities, may be managed by different software solutions, may have different configuration parameters, correspond to different versions, etc.

For example, a first type of virtual switch may be managed by a first entity, such as a network manager described further herein. The first type of virtual switch may support one or more features that are not supported by a second type of virtual switch, such as an ability to implement an L2 broadcast domain using a network overlay. The L2 broadcast domain may correspond to a virtual network identifier (VNI) used to perform network segmentation. A second type of virtual switch may be managed by a second entity, such as a virtualization manager described further herein. The second type of virtual switch may support a second set of features, such as use of virtual local area network (VLAN) identifiers for network segmentation. The second type of virtual switch may be configured by the virtualization manager and the configuration is pushed to the hosts associated with the virtual switch.

In certain circumstances, such as when new virtual switch types become available, an administrator may migrate the datacenter from using one virtual switch type to a different (e.g., newer) virtual switch type. Migration of VMs from one virtual switch to another virtual switch, of the same or different type, is conventionally a tedious process that involves manual reconfiguration of all VMs along with configuration updates on the source and destination virtual switches. This reconfiguration and updating also causes network downtime.

In conventional network migration solutions, the host is first placed in a maintenance mode, which is a costly operation of migrating the VMs to destination hosts and can take up to several days for it to finish in scaled setups.

Accordingly, techniques are needed for migrating virtual switch configurations.

SUMMARY

The technology described herein provides a method of in-place conversion of a virtual switch from a first type of virtual switch to a destination type of virtual switch. The method generally includes sending, by a first manager agent on a host to a second manager agent on the host, a call instructing the second manager agent to rekey one or more uplink ports associated with one or more logical switches implemented by the virtual switch on the host. The call includes a unique identifier associated with the first manager. The method generally includes rekeying, by the second manager agent, the one or more uplink ports on the host with the unique identifier, wherein the rekeying includes updating one or more existing uplink port identifiers assigned to the one or more uplink ports with the unique identifier associated with the first manager agent. The method generally includes sending, by the first manager agent to the second manager agent, a second call indicating that the virtual switch is not associated with an opaque network. The method generally includes removing, by the second manager agent, an association of the one or more uplink ports with the opaque network. The method generally includes informing the first manager and the second manager that the virtual switch is of the destination type of virtual switch.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIG. 2B depicts an example converged distributed virtual switch represented at a virtualization manager, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for in-place conversion of a virtual switch from one type to another type in a software defined data center (SDDC) environment. In certain aspects, the in-place conversion of a virtual switch involves one or more of a pre-check phase, a topology phase, a virtual switch migration phase, and a network conversion phase as discussed in more detail below with respect to the FIGS. 3A-3C.

Aspects of the disclosure describe an example workflow for in-place conversion of a first distributed virtual switch type to a converged distributed virtual switch type. The converged distributed virtual switch type is a type of distributed virtual switch that has one or more ports managed by a first manager, such as a virtualization manager, and one or more ports managed by a second manager, such as a network manager. The techniques described herein, however, may be used for in-place conversion of any type of virtual switch to any other type of virtual switch.

In certain aspects, the techniques described herein for in-place conversion of virtual switches may reduce network downtime, such as to on the order of tens of milliseconds (ms) or less. Further, the techniques described herein for in-place conversion of virtual switches may reduce the amount of user interaction involved in migrating virtual machines (VMs) from a first type of virtual switch to a second type of virtual switch. In addition, the techniques described herein for in-place conversion of virtual switches can be done without placing the host in maintenance mode, without the VMs shutting down, and without moving the VMs to another host.

Figure 1:
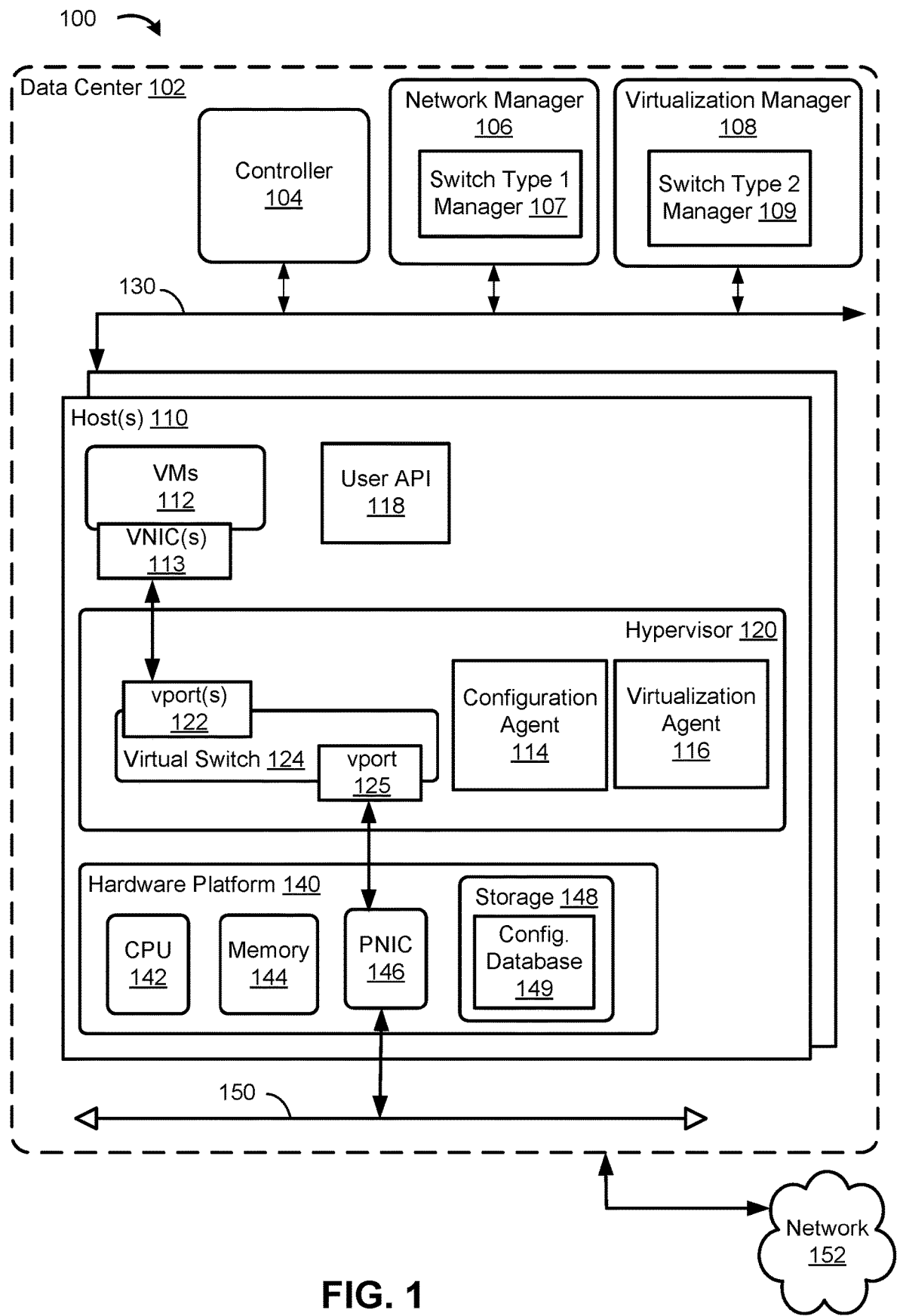
FIG. 1 depicts a block diagram of a data center, according to one or more embodiments.

FIG. 1 depicts example physical and virtual network components in a networking environment 100 in which embodiments of the present disclosure may be implemented. Networking environment 100 includes a set of networked computing entities, and may implement a logical overlay network. Networking environment 100 includes a data center 102 and an external network 152, which may be a wide area network (WAN) such as the Internet.

Data center 102 includes hosts 110, a management network 130, a data network 150, a controller 104, a network manager 106, and a virtualization manager 108. Data network 150 and management network 130 may be implemented as separate physical networks or separate virtual local area networks (VLANs) on the same physical network. Data center 102 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane Network manager 106 receives network configuration input from an administrator and generates desired state data that specifies how a logical network should be implemented in the physical infrastructure of the data center. Network manager 106 communicates with host(s) 110 via management network 130.

The control plane determines the logical overlay network topology and maintains information about network entities such as logical switches, logical routers, and endpoints, etc. The logical topology information is translated by the control plane into network configuration data that is then communicated to network elements of host(s) 110. Controller 104 generally represents a control plane that manages configuration of VMs 112 within the data center. Controller 104 may be one of multiple controllers executing on various hosts in the data center that together implement the functions of the control plane in a distributed manner. Controller 104 may be a computer program that resides and executes in a central server in the data center or, alternatively, controller 104 may run as a virtual appliance (e.g., a VM) in one of hosts 110. Although shown as a single unit, it should be understood that controller 104 may be implemented as a distributed or clustered system. That is, controller 104 may include multiple servers or virtual computing instances that implement controller functions. It is also possible for controller 104 and network manager 106 to be combined into a single controller/manager. Controller 104 collects and distributes information about the network from and to endpoints in the network. Controller 104 is associated with one or more virtual and/or physical CPUs (not shown). Processor(s) resources allotted or assigned to controller 104 may be unique to controller 104, or may be shared with other components of the data center. Controller 104 communicates with hosts 110 via management network 130, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a network administrator, defining one or more endpoints (e.g., VCIs) and the connections between the endpoints, as well as rules governing communications between various endpoints. In one embodiment, network manager 106 is a computer program that executes in a central server in networking environment 100, or alternatively, network manager 106 may run in a VM, e.g. in one of hosts 110. Network manager 106 is configured to receive inputs from an administrator or other entity, e.g., via a web interface or API, and carry out administrative tasks for the data center, including centralized network management and providing an aggregated system view for a user. As shown, in some embodiments, network manager 106 include a switch type 1 manager 107. Switch type 1 manager 107 manages virtual switch 124, which may be of a first switch type. As discussed in more detail below, after in-place conversion of virtual switch 124 from the first switch type to another switch type (e.g., a converged virtual distributed switch (VDS)), switch type 1 manager 107 manages and configures a second portion of virtual switch 124 on host 110.

In an embodiment, virtualization manager 108 is a computer program that executes in a central server in the data center (e.g., the same or a different server than the server on which network manager 106 executes), or alternatively, virtualization manager 108 runs in one of VMs 112. Virtualization manager 108 is configured to carry out administrative tasks for the data center, including managing hosts 110, managing VMs running within each host 110, provisioning VMs, transferring VMs from one host to another host, transferring VMs between data centers, transferring application instances between VMs or between hosts 110, and load balancing among hosts 110 within the data center. Virtualization manager 108 takes commands as to creation, migration, and deletion decisions of VMs and application instances on the data center. However, virtualization manager 108 also makes independent decisions on management of local VMs and application instances, such as placement of VMs and application instances between hosts 110. In some embodiments, virtualization manager 108 also includes a migration component that performs migration of VMs between hosts 110, such as by live migration. As shown, in some embodiments, virtualization manager 108 include a switch type 2 manager 109. After in-place conversion of virtual switch 124, switch type 2 manager 109 manages and configures first portion of virtual switch 124 on a host 110. In some embodiments, switch type 2 manager 109 manages the first portion of virtual switch 124 for functionality of a second switch type after the in-place conversion of virtual switch 124. As discussed in more detail below, switch type 2 manager 109 may also provide overall switch management for virtual switch 124 after the in-place conversion of virtual switch 124 on host 110.

Host(s) 110 may be communicatively connected to data network 150 and management network 130. Data network 150 and management network 130 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 110 may be geographically co-located servers on the same rack or on different racks in any arbitrary location in the data center. Host(s) 110 are configured to provide a virtualization layer, also referred to as a hypervisor 120, that abstracts processor, memory, storage, and networking resources of a hardware platform 140 into multiple VMs.

Host(s) 110 may be constructed on a server grade hardware platform 140, such as an x86 architecture platform. The hardware platform 140 of a host 110 may include components of a computing device such as one or more processors (CPUs) 142, system memory 144, one or more network interfaces (e.g., PNICs 146), storage 148, and other components (not shown). A CPU 142 is configured to execute instructions, for example, executable instructions that perform one or more operations described herein and that may be stored in the memory and storage system. The network interface(s) enable host 110 to communicate with other devices via a physical network, such as management network 130, data network 150, and/or external network 152.

As shown, in some embodiments, a host 110 includes a configuration agent 114, a virtualization agent 116, and a user application programming interface (API) 118. Configuration agent 114 is an agent for network manager 106 on hypervisor 120. Virtualization agent 116, on hypervisor 120, is an agent for virtualization manager 108.

Configuration agent 114 is associated with switch type 1 manager 107 and is responsible for configuring and managing a virtual switch of a first type, or a portion of a converged virtual switch, on host 110. Configuration agent 114 is responsible for configuration, installation, and initial setup. In some embodiments, configuration agent 114 performs the in-place conversion of virtual switch 124 from a first type of virtual switch to a converged VDS.

Virtualization agent 116 controls switching runtime configurations. Virtualization agent 116 is associated with switch type 2 manager 109 and is responsible for configuring and managing a portion of the converged VDS after in-place conversion of virtual switch 124 from the first type of virtual switch to a converged VDS, on host 110. Virtualization agent 116 may manage the converged VDS for functionality of a second type of virtual switch, as well as for overall management of virtual switch 124.

User API 118 can be a point-of-delivery (POD) service or any user API. A POD service may be exposed to a user to ask to add another host and/or to trigger in-place virtual switch conversion.

Hypervisor 120 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 120 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although parts of the disclosure are described with reference to VMs, the teachings herein also apply to other types of VCIs, such as containers, Docker containers, data compute nodes, isolated user space instances, namespace containers, and the like In some embodiments, storage 148 includes a configuration database 149. The configuration database 149 stores virtual switch configuration information for host 110.

Hypervisor 120 includes virtual switch 124. Virtual switch 124 has one or more virtual ports 122 that connect to one or more physical network interface cards (PNICs) 146. Virtual switch 124 has one or more virtual ports 122 that connect to one or more virtual NICs (VNICs) 113 of VMs 112.

VNIC(s) 113 are responsible for processing packets communicated between the VM 112 and virtual switch 124. VNICs may be, in some cases, a software implementation of a physical NIC. It should be understood that transfer of packets from one component to another in a system may involve simply passing a pointer or descriptor of a packet to a called routine.

According to embodiments of the present disclosure, an in-place conversion of virtual switch 124 on a host 110 can be performed to convert virtual switch 124 from a first type of virtual switch to a different type of virtual switch. The in-place conversion can be done at the host level, meaning that the in-place conversion can be performed independently at each host—host by host, or by host clusters.

In an illustrative example, described in detail below with reference to FIGS. 3A-3C, a first type of virtual switch may be converted to a converged virtual switch. In the illustrated example, virtual switch 124 is a first type of switch managed by network manager 106 and switch type 1 manager 107. Switch type 1 manager 107 may manage maximum transmission unit (MTU), network input/output control configuration that allows switch type 1 manager 107 to prioritize bandwidth for different network resource pools on virtual switch 124, teaming, etc., for virtual switch 124. In an example. the first type of virtual switch is a VDS that implements logical switches each having a virtual network identifier (VNI). In the illustrated example, virtual switch 124 is converted in-place to a converged VDS. The in-place conversion of virtual switch 124 may add functionality of a second type of virtual switch to virtual switch 124, where the functionality of the second type of virtual switch and overall management of converged VDS 124 is managed by virtualization manager 108, and the functionality of the first type of virtual switch continues to be managed by network manager 106 and switch type 1 manager 107. The second type of virtual switch supports features such as virtual local area network (VLAN) segmentation, VLAN identifiers (ID), tagging, and NIC teaming. Before the in-place conversion, logical switches managed by network manager 106 are represented to virtualization manager 108 as an "opaque network" indicating that the logical switch is not managed (i.e., is "read-only") by virtualization manager 108. As discussed in more detail below, after the in-place conversion of virtual switch 124 from the first type of virtual switch to the converged VDS, the logical switches are represented to virtualization manager 108 as port groups instead of opaque networks.

Figure 2A:
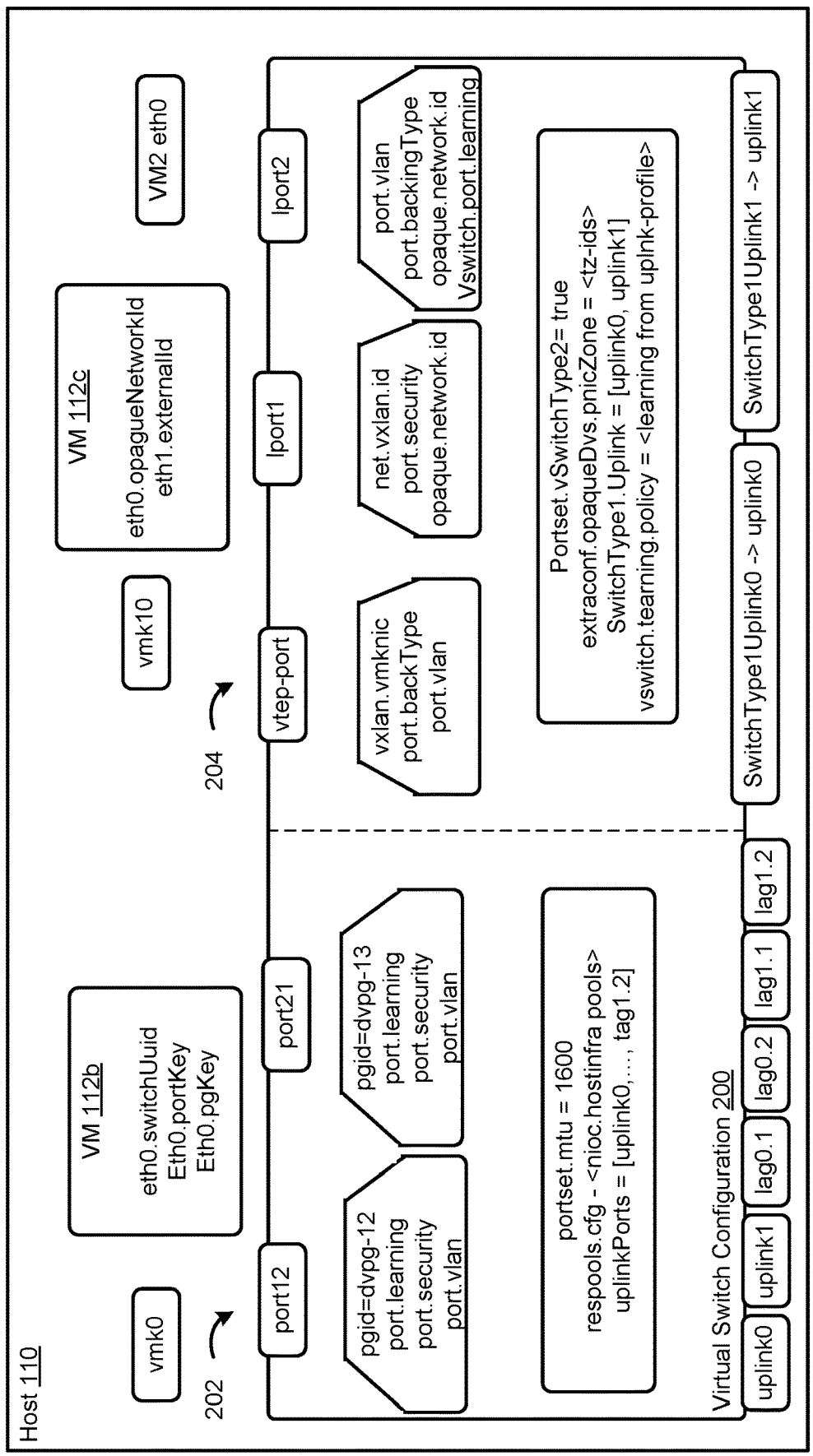
FIG. 2A depicts an example converged distributed virtual switch on a host, according to one or more embodiments.

FIG. 2A depicts an example virtual switch configuration 200 for a converged virtual switch on host 110, according to one or more embodiments. In a converged virtual switch, two different virtual switch types can be implemented and managed as a single virtual switch. For example, the first type of virtual switch, described above, can be converted to the converged virtual switch type, with the virtual switch configuration 200, including functionality of both the first type of virtual switch and the second types of virtual switch also described above.

As shown in FIG. 2A, virtual switch configuration 200 includes a first portion 202 and a second portion 204. First portion 202 is managed by virtualization manager 108 and virtualization agent 116. Second portion 204 is managed by network manager 106 and configuration agent 114. For example, virtualization manager 108 and virtualization agent 116 can provide overall virtual switch management such as PNIC management, which switch is created on which host, assignment of PNICs to link aggregation groups (LAGs) for teaming, assignment of PNICs to uplinks, and adding of hosts to virtual switch configuration 200 for first portion 202. Teaming increases the network capacity of a virtual switch by including two or more PNICs in a team.

Network manager 106 and configuration agent 114 provide a networking configuration. Network manager 106 and configuration agent 114 can manage mapping of the uplinks in second portion 204, a teaming configuration for the uplinks in second portion 204, port lifecycle, distributed firewall, and networking and security. Uplinks may correspond to PNIC(s) 146 and ports may correspond to vport(s) 122 and vport(s) 125 in FIG. 1. When a port managed in second portion 204 by network manager 106 is created, the port is read-only for virtualization manager 108 and virtualization agent 116. A corresponding logical switch configuration 210 is pushed to virtualization manager 108 as a port group (e.g., SwitchType1Portgroup in LS1) managed by network manager 106 and configuration agent 114, as shown in FIG. 2B.

Figure 3A:
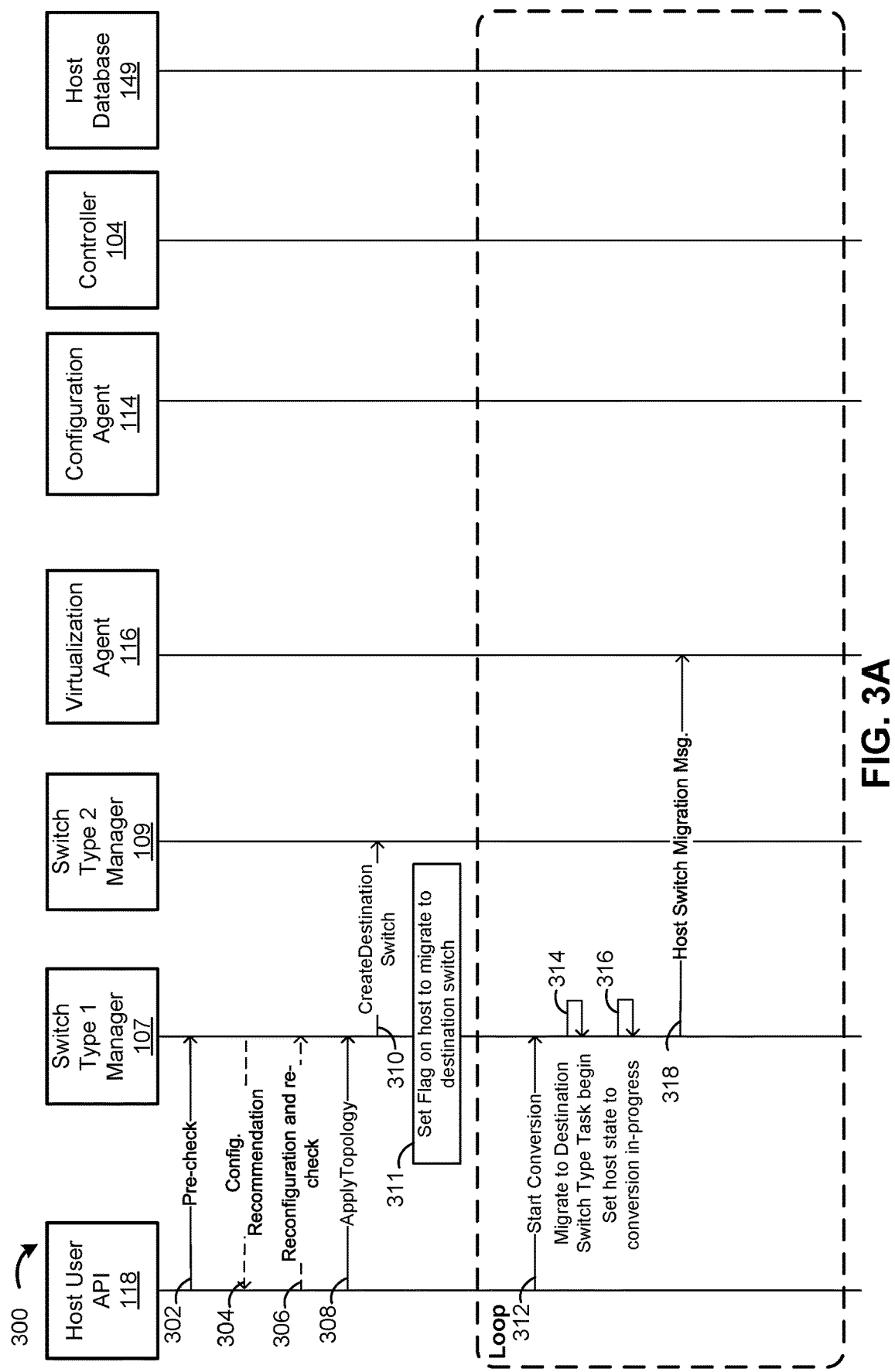
FIGS. 3A-3C depict call flow diagrams of example operations for in-place conversion of a virtual switch on a host, according to one or more embodiments.
Figure 3B:
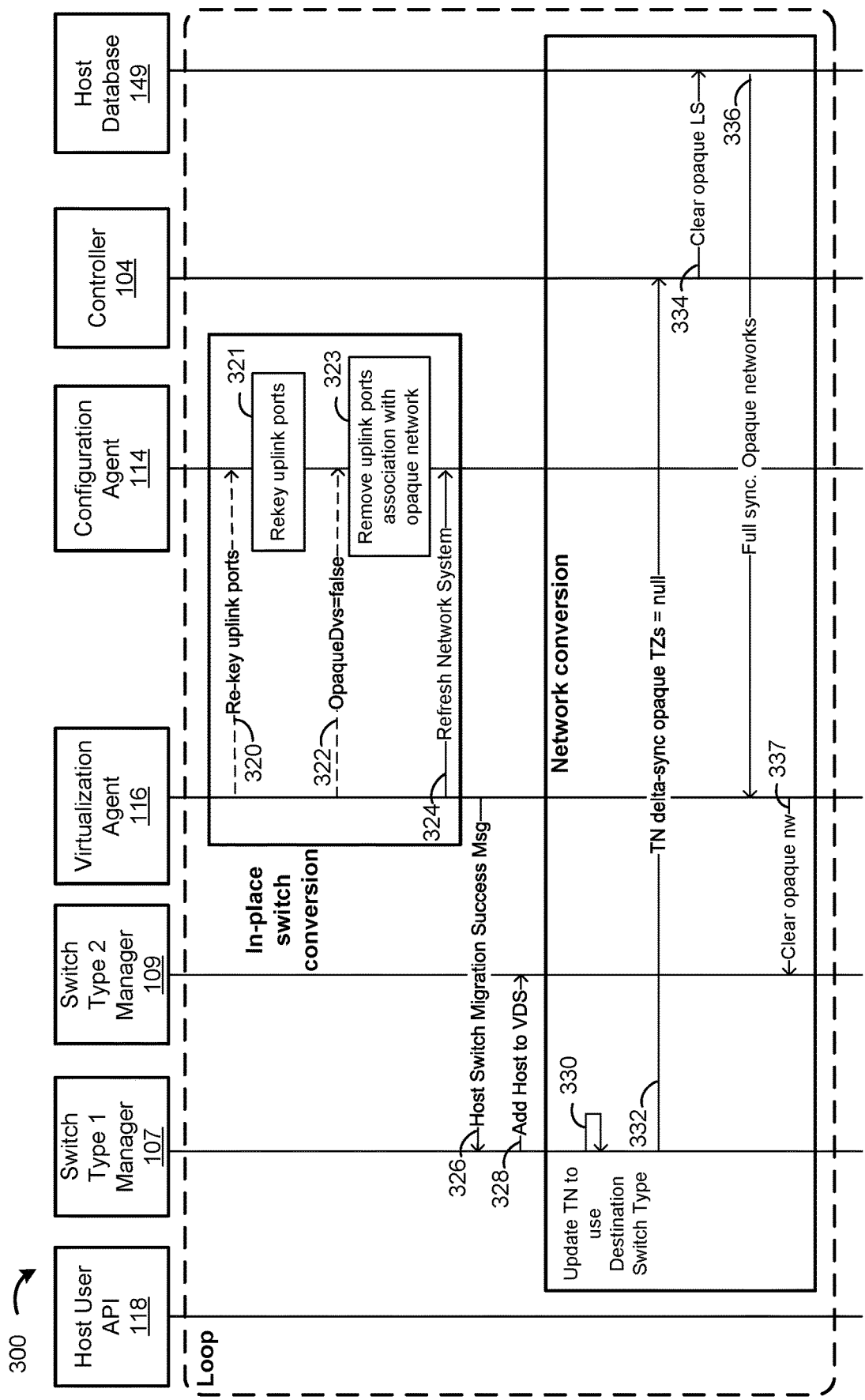
Figure 3C:
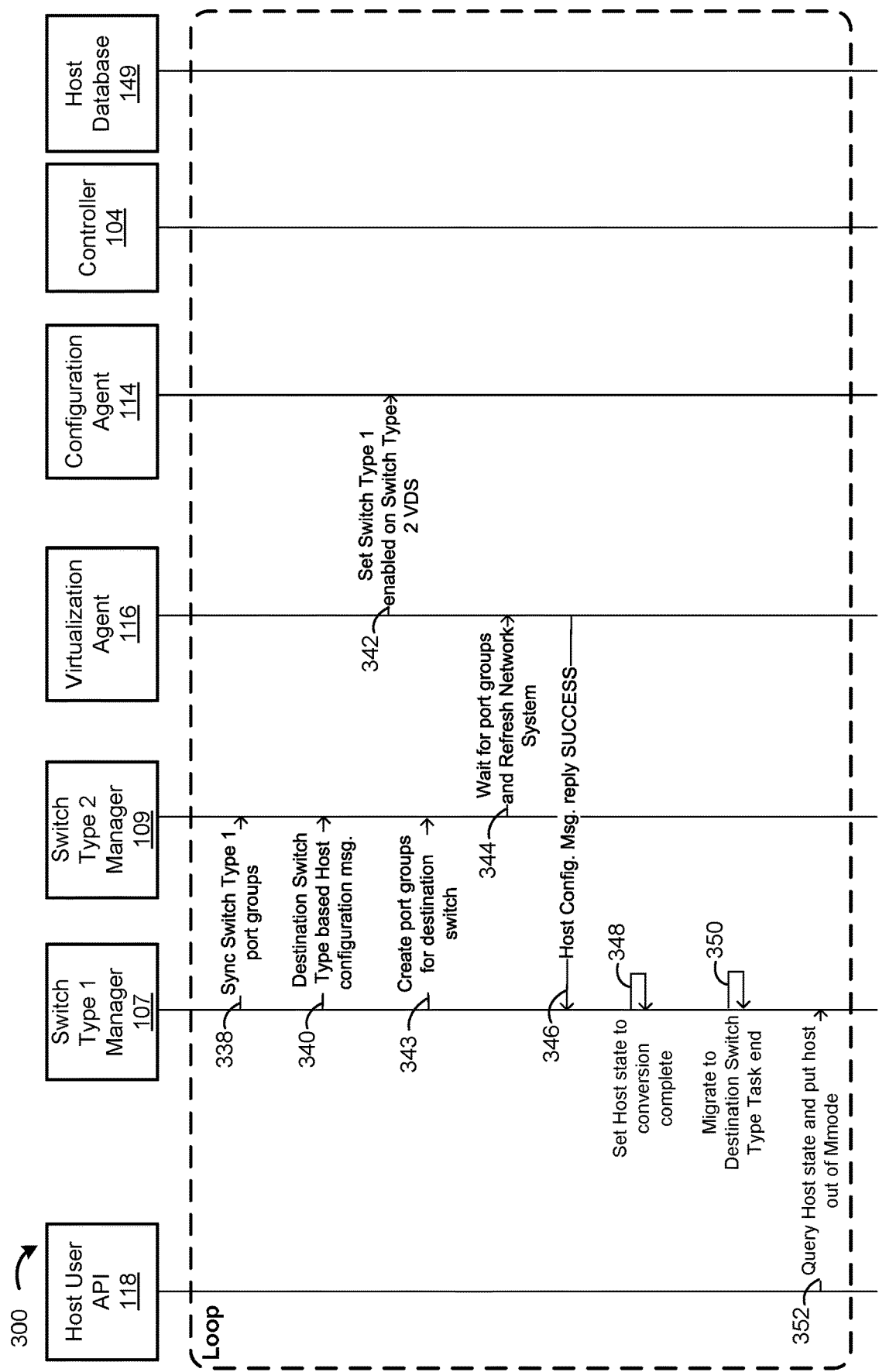

FIGS. 3A-3C depict a flowchart of example operations 300 for in-place conversion of a virtual switch on a host, according to one or more embodiments.

Operations 300 may begin with a pre-check phase. The pre-check phase may be performed to verify that the existing host and virtual switch configurations are acceptable for performing in-place conversion of virtual switch 124 and to resolve any configuration inconsistencies. For in-place conversion to a converged VDS, all hosts 110 associated with the distributed virtual switch (of the first type) to be converted to a converged VDS, meaning all hosts 110 that implement a virtual switch 124 configured according to the configuration of the distributed virtual switch, are expected to have a consistent virtual switch type 1 configuration to be migrated to the converged VDS. For example, a transport node profile defines a configuration applied to a cluster of hosts 110 associated with the distributed virtual switch. The transport node profile may define transport zones, member hosts 110, type 1 switch configuration, uplink profile, and mapping of PNIC(s) to uplinks. Further, after in-place conversion, network configurations such as teaming, network input/output control, MTU and the like may be defined globally, rather than at the host-level. Therefore, the pre-check phase may check that all hosts 110 associated with the distributed virtual switch have the same network configurations for the first type of virtual switch. The pre-check phase may check whether each of the hosts 110 associated with the distributed virtual switch has an operating version that supports the converged VDS type.

As shown in FIG. 3A, at 302, a host user API 118 can perform the pre-check with switch type 1 manager 107 to get topology from switch type 1 manager 107. The pre-check may be a GetTopology API call. In response to the GetTopology call, switch type 1 manager 107 provides a mapping of the switch type 1 configurations to the converged VDS configuration, a list of hosts 110 that implement a virtual switch 124 configured according to the configuration of the distributed virtual switch, a list of VNICs that are associated with each virtual switch 124 configured according to the configuration of the distributed virtual switch and managed by switch type 1 manager 107, and the associated configuration information, status, and operating versions. The mapping of the switch type 1 to the converged VDS may include a mapping of the name of the distributed virtual switch, that is of the first type of virtual switch, mapped to a name for the second type of virtual switch.

In some embodiments, if there is an issue with the status (e.g., such as a failed host or network component) an inconsistent network configuration, one or more hosts 110 with an operating version that does not support converged VDS, or the like, switch type 1 manager 107 can provide a recommendation, at 304, to fix the environment. A reconfiguration can be performed and the pre-check can be performed again, at 306, on the reconfigured environment. In some embodiments, the pre-check phase can be initiated automatically, such as by a POD service. Alternatively, the pre-check phase can be initiated at any time by a user via host user API 118.

Once the pre-check is successfully completed, a topology phase is performed. During this topology phase, the VDS configuration owned by switch type 1 manager 107 is obtained, which is used to create a corresponding VDS counterpart at switch type 2 manager 109 for the destination virtual switch, at 310.

As shown in FIG. 3A, at 308, host user API 118 can send an ApplyTopology message to switch type 1 manager 107. The ApplyTopology message may be a Set Topology API call to create the destination configuration for the virtual switch. For example, the creation of a configuration for a converged VDS includes configuring port groups and configuration objects across all hosts 110 associated with converged VDS as illustrated in the example in FIG. 2B. Switch type 1 manager 107 provides a CreateDestinationSwitch call to switch type 2 manager 109. The CreateDestinationSwitch call includes a universal unique identifier (UUID). The CreateDestinationSwitch call creates a configuration for the converged VDS on virtualization manager 108, for example, as shown in FIG. 2B. Use of the UUID for the destination switch maintains consistency by allowing the same port ID and switch ID to be used on the data path. This ensures no traffic disruption will occur.

Creating a corresponding VDS counterpart configuration at switch type 2 manager 109 involves first performing a translation (not shown) of the VDS configuration owned by switch type 1 manager 107 before pushing the configuration to switch type 2 manager 109. For example, a network input/output control configuration of the distributed virtual switch of the first type may use a percentage value to indicate the bandwidth for traffic reservation, whereas, for the converged VDS, the network input/output configuration may indicate the bandwidth for traffic reservation as megabits per second (Mbps). In this case, the percentage value may be translated to an Mbps value before the configuration is pushed to the switch type 2 manager 109.

At this point, the destination virtual switch is configured at switch type 2 manager 109, but has not yet been synced to host 110. It is noted that no new switch is created on host 110, as this is an in-place migration/conversion of an existing virtual switch 124 from a first type that is managed by a first manager to a converged virtual switch having type 1 and type 2 portions managed by a first and second manager, respectively.

At 311, switch type 1 manager 107 sets a flag on host 110 to migrate to the destination switch type. The followings operations 312-352 are performed per host 110 to be migrated to the destination switch type.

At 312, host user API 118 initiates in-place conversion of virtual switch 124 from its existing switch type to the destination switch type. In this example, an existing switch type 2 virtual switch 124 is converted to a converged VDS configuration that includes functions of the existing first type of distributed virtual switch (e.g., function of switch type 2) and also functions of switch type 1. The virtual switch 124 according to the converged VDS configuration is managed by both switch type 1 manager 107 and switch type 2 manager 109. A POD service can automatically start migration of the configuration of virtual switch 124 to the destination switch type configuration or a user can select a host 110 or hosts 110 and run migration for that host or hosts. Host user API 118 can initiate the in-place conversion by a MigrateToDestinationSwitchTask API call to switch type 1 manager 107.

At 314, switch type 1 manager 107 starts a migration task for the selected host 110.

At 316, switch type 1 manager 107 sets the host state to 'conversion in-progress'.

Once switch type 1 manager 107 receives the starts the migration task, switch type 1 manager 107 sends a request to the host 110 to trigger the in-place conversion of virtual switch 124. At 318, switch type 1 manager 107 sends virtualization agent 116 a host switch migration message. The host switch migration message contains a list of one or more virtual switches to be migrated in-place.

Once virtualization agent 116 receives the host switch migration message, virtualization agent 116 will call configuration agent 114 to perform the in-place switch conversion. Uplink port management is part of the in-place conversion. In some embodiments, the in-place switch conversion involves translation of the uplink ports. Virtual switch 124 may be configured according to the configuration of a distributed virtual switch that comprises the configuration for a plurality of virtual switches 124, on multiple hosts, the plurality of virtual switches 124 managed as a single entity. The plurality of virtual switches 124 can have different uplink ports associated with different uplinks on the different hosts 110 on which they run. The uplink ports of the plurality of virtual switches 124 associated with the distributed virtual switch configuration can have the same key. For a converged VDS, however, all virtual port IDs, including uplink keys, across hosts 110 are unique. Accordingly, the existing keys for the uplink ports associated with the distributed virtual switch are converted to UUIDs. As shown in FIG. 3A, virtualization agent 116 calls configuration agent 114 to rekey the uplink ports, at 320. Rekeying the uplink ports, at 321, may include assigning the UUID from the switch type 2 configuration to the uplink ports for the switch type 1 configuration, where the uplink UUIDs are unique across all hosts 110 associated with the distributed virtual switch, which as stated are all hosts that implement a virtual switch 124 configured according to the configuration of the distributed virtual switch. A single API exposed by configuration agent 114 can perform the rekeying.

The switch type 1 may be associated with an opaque network with respect to virtualization manager 108. An opaque network is a network created and managed by a separate entity outside of virtualization manager 108. For example, a logical network that is created and managed by network manager 106 appears in virtualization manager 108 as an opaque network of the type SwitchType1.LogicalSwitch. The configuration for the switch type 1 for virtual switch 124, including an indication of an opaque network, may be stored in configuration database 149.

Accordingly, after the translation (e.g., rekeying), virtualization agent 116 instructs configuration agent 114 to remove, at 323 the switch configuration as opaque network (e.g., marking opaquedvs=false), at 322, thereby converting the virtual switch 124 from the existing switch type to the destination switch type. Thus, logical switches implemented by the virtual switch 124 will show up as a port group instead of an opaque network. The virtual ports in a port group may be configured with the same configuration that was previously used for a logical switch associated with virtual switch 124. At this point, all existing ports/uplinks on virtual switch 124 continue to forward traffic as they were prior to in-place conversion, since there are no changes made in the data path.

After rekeying the ports, at 321, and removing the opaque network configuration, at 323 configuration agent 114 performs a network system refresh, at 324. The network refresh may be an API call that internally triggers synchronization between host 110 and virtualization manager 108 to notify virtualization manager 108 that virtual switch 124 has been converted to the destination switch type.

At this point, virtual switch 124 has been converted on host 110, but the virtual switch 124 is still not enabled for the switch type 1 functionality.

Referring now to FIG. 3B, at 326, virtualization agent 116 sends a host switch migration success message to switch type 1 manager 107.

At 328, the migration task started at switch type 1 manager 107 adds the host 110 to the converged VDS by an API call to switch type 2 manager 109. Although host 110 is already added in the host configuration, host 110 is still not part of the converged VDS on switch type 2 manager 109.

At this point, the network conversion can be performed at 330-336 to convert from opaque network to port groups. The network conversion may vary based on the type of virtual switch being converted and the destination virtual switch type.

At 330, the migration task updates the transport node configuration at switch type 1 manager 107 to use the converged VDS configuration. For example, the switch type 1 configuration is removed and the converged VDS configuration is added.

In the illustrated example, converting the virtual switch 124 from the switch type 1 configuration to the converged VDS configuration includes switch type 1 manager 107 sending a transport node realization state message to controller 104, at 332. For example, a 'TNdeltasyncOpaqueTZs=Null' message indicates to controller 104 to clear configurations associated with virtual switch 124 of the switch type 1 (e.g., referred to as the "source" virtual switch type) so that host 110 can create configurations for the converged VDS configuration (e.g., referred to as the destination switch type). In the illustrated example, the message indicates to clear logical switch configurations from configuration database 149. The transport node realization state message may indicate that opaque TZs=0. Accordingly, at 334, controller 104 deletes logical switch opaque networks, managed by switch type 1 manager 107, in configuration database 149 on host 110.

Another workflow is triggered, at 336, to synchronize the port groups to host 110. For example, a 'FullsyncOpaqueNetworks' call may be sent from host 110 configuration database 149 to virtualization agent 116. This message allows virtualization agent 116 to read the updated configuration (e.g., the port group configurations) from configuration database 149. At 337, virtualization agent 116 then sends a message to switch type 2 manager 109 so that the opaque network configurations can be removed from the virtualization manager 108, At 338, switch type 1 manager 107 instructs switch type 2 manager 109 to synchronize port groups enabled for switch type 1 functionality.

At 340, switch type 1 manager 107 sends a 'HostConfig' message to virtualization agent 116. The HostConfig message includes the newly added converged VDS configuration.

At 342, virtualization agent 116 enables the virtual switch 124 for switch type 1 networking.

At 343, switch type 1 manager 107 calls switch type 2 manager 109 to create and push port groups for logical switches backed by the converged VDS configuration.

Referring now to FIG. 3C, after synchronization and enabling the switch type 1 functionality, another network system refresh is performed. At 344, virtualization agent 116 calls configuration agent 114 to wait for port groups and refresh the network system. The network system refresh updates any system or VM 112 port backings from the old switch type 1 backing to the new converged VDS configuration backed port groups. At this point, such ports on host 110 have moved to second portion 204, of the converged VDS configuration, that is managed by switch type 1 manager 107. It is noted that the port configuration remains unchanged, only the management layers (e.g., host switch type and the properties on the host) have been updated with the in-place conversion to allow the ports to be managed by switch type 1 manager 107 and are represented as switch type 1 ports groups to switch type 2 manager 109.

Once the port groups have been pushed and the network system has been refreshed, VMs 112 will start displaying configurations showing that they are connected to the new type of network.

At 346, virtualization agent 116 sends a host configuration message success reply message to switch type 1 manager 107. The host configuration message success reply marks completion of the host configuration. Switch type 1 manager 107 can relay to the migration task the completion of the in-place conversion, at 348, and the migration task ends, at 350.

In the event that host 110 was put into a maintenance mode, host user API 118 can query the host state from switch type 1 manager 107 and take host 110 out of the maintenance mode.

The embodiments described herein provide a technical solution to a technical problem associated with migrating from a first virtual switch type to a second virtual switch type. More specifically, implementing the embodiments herein allows for in-place conversion of a virtual switch 124. The in-place conversion provides seamless migration of VMs 112 without host 110 being put into a maintenance mode and with reduced downtime (e.g., only a few milliseconds downtime) or no downtime.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of in-place conversion of a virtual switch from a first type of virtual switch to a destination type of virtual switch, the method comprising:
   sending, by a first manager agent on a host to a second manager agent on the host, a call instructing the second manager agent to rekey one or more uplink ports associated with one or more logical switches implemented by the virtual switch on the host, wherein:
      the first manager agent is associated with a first manager and the second manager agent is associated with a second manager; and
      the call includes a unique identifier associated with the first manager;
   rekeying, by the second manager agent, the one or more uplink ports on the host with the unique identifier, wherein the rekeying includes updating one or more existing uplink port identifiers assigned to the one or more uplink ports with the unique identifier associated with the first manager agent;
   sending, by the first manager agent to the second manager agent, a second call indicating that the virtual switch is not an opaque network;
   removing, by the second manager agent, an association of the one or more uplink ports with the opaque network; and
   informing the first manager and the second manager that the virtual switch is of the destination type of virtual switch.

2. The method of claim 1, wherein the first type of virtual switch comprises a virtual distributed switch (VDS) managed by the second manager and the destination type of virtual switch comprises a converged VDS, wherein the converged VDS includes functionality of the VDS managed by the second manager and functionality of a second type of virtual switch managed by the first manager.

3. The method of claim 2, wherein the VDS managed by the second manager implements the one or more logical switches, and wherein after the in-place conversion of the virtual switch to the converged VDS, the one or more logical switches are configured as one or more virtual port groups.

4. The method of claim 1, further comprising, before sending, by the first manager agent on the host to the second manager agent on the host, the call instructing the second manager agent to rekey:
   obtaining, from the second manager, configurations of hosts associated with a virtual distributed switch (VDS) configuration shared by the virtual switch, the configurations including one or more of: a transport node profile, a list of the hosts associated with the VDS configuration, an uplink profile, a mapping a network interfaces of the hosts to uplinks, a network configuration, a configuration of the one or more logical switches, an operating version of the hosts, a maximum transmission unit configuration, and a network input/out control configuration, a list of virtual ports of virtual computing instances (VICs) connected to the one or more logical switches, a status of the hosts, a status of one or more network components; and
   verifying, based on the obtained configurations, that the hosts and the virtual switch have an acceptable configuration for in-place conversion.

5. The method of claim 1, further comprising, before sending, by the first manager agent on the host to the second manager agent on the host, the call instructing the second manager agent to rekey:
   sending, by the second manager, a call to the first manager, to create the destination type of virtual switch, the call including the unique ID;
   performing, by the first manager, a translation of a configuration of the first type of virtual switch, managed by the second manager, to a configuration of the destination type of virtual switch; and
   configuring the destination type of virtual switch at the first manager.

6. The method of claim 1, further comprising, before sending, by the first manager agent on the host to the second manager agent on the host, the call instructing the second manager agent to rekey:
   sending, by the second manager to the first manager agent on the host, a call instructing the first manager to initiate in-place conversion of the virtual switch.

7. The method of claim 1, further comprising, after informing the first manager and the second manager that the virtual switch is of the destination type of virtual switch:

adding, by the second manager agent on the host, the host to the virtual switch of the destination type of virtual switch at the first manager agent on the host; and updating, by the second manager agent on the host, a configuration to use the virtual switch of the destination switch type for the host.

8. The method of claim 1, further comprising, after informing the first manager and the second manager that the virtual switch is of the destination type of virtual switch:

sending, by the second manager agent on the host to a controller of the host, a call instructing the controller to remove the association of the one or more uplink ports with the opaque network from a configuration for the virtual switch stored in a database on the host;

sending, by the controller of the host, a call to remove the association of the one or more uplink ports with the opaque network from the configuration for the virtual switch stored in the database on the host;

sending, by the database on the host to the first manager agent on the host, a call instructing to remove the association of the one or more uplink ports with the opaque network from the configuration for the virtual switch at the first manager; and sending, by the first manager agent on the host to the first manager, a call to remove the association of the one or more uplink ports with the opaque network from the configuration for the virtual switch at the first manager.

9. The method of claim 1, further comprising, after informing the first manager and the second manager that the virtual switch is of the destination type of virtual switch:

performing, by the first manager agent on the host, a system refresh; and sending, by the first manager agent on the host to the second manager, an indication of successful in-place conversion of the virtual switch.

10. A system comprising one or more processors and a non-transitory computer readable medium comprising instructions that, when executed by the one or more processors, cause the system to perform a method of in-place conversion of a virtual switch from a first type of virtual switch to a destination type of virtual switch, the method comprising:

sending, by a first manager agent on a host to a second manager agent on the host, a call instructing the second manager agent to rekey one or more uplink ports associated with one or more logical switches implemented by the virtual switch on the host, wherein:
the first manager agent is associated with a first manager and the second manager agent is associated with a second manager; and
the call includes a unique identifier associated with the first manager;

rekeying, by the second manager agent, the one or more uplink ports on the host with the unique identifier, wherein the rekeying includes updating one or more existing uplink port identifiers assigned to the one or more uplink ports with the unique identifier associated with the first manager agent;

sending, by the first manager agent to the second manager agent, a second call indicating that the virtual switch is not an opaque network;

removing, by the second manager agent, an association of the one or more uplink ports with the opaque network; and informing the first manager and the second manager that the virtual switch is of the destination type of virtual switch.

11. The system of claim 10, wherein the first type of virtual switch comprises a virtual distributed switch (VDS) managed by the second manager and the destination type of virtual switch comprises a converged VDS, wherein the converged VDS includes functionality of the VDS managed by the second manager and functionality of a second type of virtual switch managed by the first manager.

12. The system of claim 11, wherein the VDS managed by the second manager implements the one or more logical switches, and wherein after the in-place conversion of the virtual switch to the converged VDS, the one or more logical switches are configured as one or more virtual port groups.

13. The system of claim 10, the method further comprising, before sending, by the first manager agent on the host to the second manager agent on the host, the call instructing the second manager agent to rekey:

obtaining, from the second manager, configurations of hosts associated with a virtual distributed switch (VDS) configuration shared by the virtual switch, the configurations including one or more of: a transport node profile, a list of the hosts associated with the VDS configuration, an uplink profile, a mapping a network interfaces of the hosts to uplinks, a network configuration, a configuration of the one or more logical switches, an operating version of the hosts, a maximum transmission unit configuration, and a network input/out control configuration, a list of virtual ports of virtual computing instances (VICs) connected to the one or more logical switches, a status of the hosts, a status of one or more network components; and verifying, based on the obtained configurations, that the hosts and the virtual switch have an acceptable configuration for in-place conversion.

14. The system of claim 10, the method further comprising, before sending, by the first manager agent on the host to the second manager agent on the host, the call instructing the second manager agent to rekey:

sending, by the second manager, a call to the first manager, to create the destination type of virtual switch, the call including the unique ID;

performing, by the first manager, a translation of a configuration of the first type of virtual switch, managed by the second manager, to a configuration of the destination type of virtual switch; and configuring the destination type of virtual switch at the first manager.

15. The system of claim 10, the method further comprising, before sending, by the first manager agent on the host to the second manager agent on the host, the call instructing the second manager agent to rekey:

sending, by the second manager to the first manager agent on the host, a call instructing the first manager to initiate in-place conversion of the virtual switch.

16. The system of claim 10, the method further comprising, after informing the first manager and the second manager that the virtual switch is of the destination type of virtual switch:

adding, by the second manager agent on the host, the host to the virtual switch of the destination type of virtual switch at the first manager agent on the host; and updating, by the second manager agent on the host, a configuration to use the virtual switch of the destination switch type for the host.

17. The system of claim 10, the method further comprising, after informing the first manager and the second manager that the virtual switch is of the destination type of virtual switch:

sending, by the second manager agent on the host to a controller of the host, a call instructing the controller to remove the association of the one or more uplink ports with the opaque network from a configuration for the virtual switch stored in a database on the host;

sending, by the controller of the host, a call to remove the association of the one or more uplink ports with the opaque network from the configuration for the virtual switch stored in the database on the host;

sending, by the database on the host to the first manager agent on the host, a call instructing to remove the association of the one or more uplink ports with the opaque network from the configuration for the virtual switch at the first manager; and sending, by the first manager agent on the host to the first manager, a call to remove the association of the one or more uplink ports with the opaque network from the configuration for the virtual switch at the first manager.

18. The system of claim 10, the method further comprising, after informing the first manager and the second manager that the virtual switch is of the destination type of virtual switch:

performing, by the first manager agent on the host, a system refresh; and sending, by the first manager agent on the host to the second manager, an indication of successful in-place conversion of the virtual switch.

19. A non-transitory computer-readable medium comprising instructions that, when executed by one or more processors of a computing system, cause the computing system to perform a method of in-place conversion of a virtual switch from a first type of virtual switch to a destination type of virtual switch, the method comprising:

sending, by a first manager agent on a host to a second manager agent on the host, a call instructing the second manager agent to rekey one or more uplink ports associated with one or more logical switches implemented by the virtual switch on the host, wherein:
 the first manager agent is associated with a first manager and the second manager agent is associated with a second manager; and
 the call includes a unique identifier associated with the first manager;

rekeying, by the second manager agent, the one or more uplink ports on the host with the unique identifier, wherein the rekeying includes updating one or more existing uplink port identifiers assigned to the one or more uplink ports with the unique identifier associated with the first manager agent;

sending, by the first manager agent to the second manager agent, a second call indicating that the virtual switch is not an opaque network;

removing, by the second manager agent, an association of the one or more uplink ports with the opaque network; and informing the first manager and the second manager that the virtual switch is of the destination type of virtual switch.

20. The non-transitory computer-readable medium of claim 19, wherein the first type of virtual switch comprises a virtual distributed switch (VDS) managed by the second manager and the destination type of virtual switch comprises a converged VDS, wherein the converged VDS includes functionality of the VDS managed by the second manager and functionality of a second type of virtual switch managed by the first manager.

* * * * *